United States Patent

Trotter et al.

[11] Patent Number: 5,321,074
[45] Date of Patent: Jun. 14, 1994

[54] PROCESS FOR PREPARING HYDROLYTICALLY STABLE POLY (ETHYLENE-2,6-NAPHTHALENE DICARBOXYLATE) POLYMERS

[75] Inventors: Jimmy R. Trotter; Bobby J. Sublett, both of Kingsport, Tenn.

[73] Assignee: Eastman Chemical Company, Kingsport, Tenn.

[21] Appl. No.: 96,400

[22] Filed: Jul. 26, 1993

[51] Int. Cl.$^5$ .................................. C08K 3/10
[52] U.S. Cl. .............................. 524/779; 528/272; 528/275; 528/298; 528/308; 524/788
[58] Field of Search .......... 528/272, 275, 298, 308; 524/779, 788

[56] References Cited

U.S. PATENT DOCUMENTS

| | | | |
|---|---|---|---|
| 3,962,189 | 6/1976 | Russin et al. | 528/277 |
| 4,067,855 | 1/1978 | Miwa et al. | 528/275 |
| 4,348,446 | 9/1982 | Mitsuishi et al. | 428/148 |
| 4,357,461 | 11/1982 | Go et al. | 524/724 |
| 4,732,799 | 3/1988 | Sakamoto et al. | 428/141 |
| 4,812,360 | 3/1989 | Utsumi | 428/337 |
| 5,017,680 | 5/1991 | Sublett | 528/274 |
| 5,106,694 | 4/1992 | Sublett | 528/279 |

*Primary Examiner*—Samuel A. Acquah
*Attorney, Agent, or Firm*—John D. Thallemer; William P. Heath, Jr.

[57] ABSTRACT

The present invention relates to a process for preparing poly(ethylene-2,6-naphthalene dicarboxylate) polymers wherein a low concentrations of an alkali metal salt is present. More specifically, 15 ppm to 100 ppm of an alkali metal derived from an alkali metal salt is added in the melt polymerization reaction mixture during formation of such polymers. The polymers are useful in applications where improved hydrolytic stability at elevated temperatures and high humidity (>50% relative humidity) are required.

11 Claims, No Drawings

PROCESS FOR PREPARING HYDROLYTICALLY STABLE POLY (ETHYLENE-2,6-NAPHTHALENE DICARBOXYLATE) POLYMERS

FIELD OF THE INVENTION

The present invention relates to a process for preparing poly(ethylene-2,6-naphthalene dicarboxylate) polymers wherein a low concentrations of an alkali metal salt is present. More specifically, 15 ppm to 100 ppm of an alkali metal derived from an alkali metal salt is added in the melt polymerization reaction mixture during formation of such polymers. The polymers are useful in applications where improved hydrolytic stability at elevated temperatures and high humidity (>50% relative humidity) are required.

BACKGROUND OF THE INVENTION

It is well known that when polyesters are exposed to high temperatures, as they often must be during processing and application from the molten state, they tend to degrade with detrimental loss of physical and chemical properties such as a decrease in molecular weight and discoloration. This condition often results in inferior products at best, or worse, it renders these polyesters useless in the intended application. Therefore, it would be desirable to have polyester compositions with improved high temperature and high humidity stability.

Organic salts of alkali metals have been combined with polyethylene terephthalate type polyesters. U.S. Pat. Nos. 5,017,680 and 3,962,189 disclose catalyst-inhibitor systems for preparing polyethylene terephthalate with a fast reaction rate and good color. U.S. Pat. No. 5,106,944 discloses a catalyst inhibitor system for preparing poly(1,4-cyclohexenedimethylene terephthalate) with a fast reaction rate and good color. The catalyst inhibitor system of U.S. Pat. No. 5,017,680 contains organic salts of alkali metals along with a complex of titanium alkoxide. The catalyst inhibitor system of U.S. Pat. No. 3,962,189 contains organic salts of alkali metals along with manganese, zinc or calcium, antimony, cobalt, phosphorous, and titanium. The catalyst inhibitor system of U.S. Pat. No. 5,106,944 contains organic salts of alkali metals along with a complex of titanium alkoxide. The patents do not include poly(ethylene-2,6-naphthalene dicarboxylate), and do not address hydrolytic stability.

U.S. Pat. No. 4,357,461 discloses a process for preparing a heat stable polyester resin wherein an alkali metal salt of ethylenediaminetetraacetic acid (EDTA) is present in the melt polymerization reaction mixture. The patent does not include poly(ethylene-2,6-naphthalene dicarboxylate), and is chiefly concerned with reducing the acetaldehyde generation rate.

In contrast, the present inventors have unexpectedly determined that the hydrolytic stability of poly(ethylene-2,6-naphthalene dicarboxylate), referred to as PEN, particularly at high humidity (>50% relative humidity) and elevated temperatures (>23° C.), can be significantly enhanced by the addition of 15 ppm to 100 ppm of an alkali metal derived from an alkali metal salt to the melt polymerization reaction mixture.

SUMMARY OF THE INVENTION

Accordingly, it is one object of the present invention to stabilize a poly(ethylene-2,6-naphthalene dicarboxylate) polymer against thermal degradation.

Accordingly, it is another object of the invention to provide a poly(ethylene-2,6-naphthalene dicarboxylate) polymer stabilized against hydrolysis.

These and other objects are accomplished herein by a process for preparing a hydrolitically stable poly(ethylene-2,6-naphthalene dicarboxylate) polymer comprising adding 15 ppm to 100 ppm of an alkali metal salt in the melt polymerization reaction mixture during formation of such polymer.

DESCRIPTION OF THE INVENTION

The poly(ethylene-2,6-naphthalene dicarboxylate) polymer of the present invention contains a dicarboxylic acid component and a diol component. The dicarboxylic acid is naphthalene-2,6-dicarboxylic acid or naphthalene-2,6-dicarboxylic ester. Preferably, the dicarboxylic acid is dimethyl-2,6-naphthalenedicarboxylate.

The diol component of the polymer consists of an aliphatic or cycloaliphatic diol and combinations thereof. The aliphatic diols preferably have 2 to 20 carbon atoms, and the cycloaliphatic diols preferably have 6 to 20 carbon atoms. Included within the class of aliphatic diols are aliphatic diols having ether linkages such as polydiols having 4 to 800 carbon atoms. Suitable diols include: ethylene glycol, diethylene glycol, triethylene glycol, 1,2-propanediol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,4-butanediol, 1,5-pentanediol, 1,6-hexanediol, 2,2,4-trimethyl-1,6-hexanediol, thioethanol, 1,2-cyclohexanedimethanol, 1,3-cyclohexanedimethanol, and 1,4-cyclohexanedimethanol. Preferably, the diol(s) are ethylene glycol, combinations of ethylene glycol with diethylene glycol, combinations of diethylene glycol with 1,4-cyclohexanedimethanol, combinations of ethylene glycol with 1,4-cyclohexanedimethanol, and combinations of ethylene glycol with a variety of suitable co diols.

Semi-crystalline and amorphous materials are within the scope of the present invention. It is to be understood that the PEN polymers of this invention contain substantially equal molar proportions of acid equivalents (100 mole%) to hydroxy equivalents (100 mole%). Thus, the PEN polymers will have a total of acid and hydroxyl equivalents equal to 200 mole percent. The PEN polymers have an inherent viscosity of 0.4 to 1.5 dl/g. Preferably, the polymer has an inherent viscosity of 0.6 to 1.2 dl/g as measured at 25° C. using 0.50 grams of polymer per 100 ml of a solvent consisting of 60% by weight phenol and 40% by weight tetrachloroethane.

The poly(ethylene-2,6-naphthalene dicarboxylate) polymer is prepared by conventional polycondensation procedures well-known in the art which generally include a combination of melt phase and solid state polymerization. Melt phase describes the molten state of PEN during the initial polymerization process. The initial polymerization process includes direct condensation of the naphthalene-2,6-dicarboxylic acid with the diol(s) or by ester interchange using naphthalene-2,6-dicarboxylic ester. For example, dimethyl-2,6-naphthalenedicarboxylate is ester interchanged with the diol(s) at elevated temperatures in the presence of a catalyst. The melt phase is concluded by extruding the PEN polymer into strands and pelletizing. The PEN polymer may optionally be solid stated. Solid stating involves heating the PEN pellets to a temperature in excess of 200° C., but well below the crystalline melt point, either in the presence of an inert gas stream or in a vacuum to remove a diol. Several hours are generally required in the "solid state" unit to build the molecular weight to the target level.

Typical polyesterification catalysts which may be used include titanium alkoxides, dibutyl tin dilaurate, combinations of zinc, manganese, or magnesium acetates or benzoates with antimony oxide or antimony triacetate.

The alkali metal salt is added in the melt polymerization reaction mixture during formation of the PEN polymer. The alkali metal salt is added in an amount to provide 15 ppm to 100 ppm of the alkali metal species in the final PEN polymer composition. Examples of suitable alkali metal salts include: sodium carbonate, sodium acetate, sodium benzoate, sodium succinate, sodium acetylacetonate, sodium methoxide, sodium ethoxide, sodium dioxide, lithium carbonate, lithium acetate, lithium benzoate, lithium succinate, lithium acetylacetonate, lithium methoxide, lithium ethoxide, lithium glycoxide, potassium carbonate, potassium acetate, potassium benzoate, potassium succinate, potassium acetylacetonate, potassium methoxide, potassium ethoxide, potassium glycoxide, calcium acetate, calcium benzoate, calcium succinate, calcium acetylacetonate, calcium methoxide, calcium ethoxide, calcium glycoxide, magnesium acetate, magnesium benzoate, magnesium succinate, magnesium acetylacetonate, magnesium methoxide, magnesium ethoxide and magnesium glycoxide. Preferred alkali metal salts include sodium, lithium and potassium carbonate.

The only limitation on the alkali metal salt is that it must be capable of forming napthalene dicarboxylic acid salts in situ when included in the reaction mix for preparing the PEN polymer, and the acid portion of the salt must be volatile enough so that when liberated as the acid in the reaction mixture, it does not become a chain terminator.

Additives such as fillers, for example, titanium dioxide and talc, stabilizers, antioxidants, buffers, colorants, dyes, pigments and the like normally used with polymers may be used if desired. Such additives, their amounts, and their use are well known in the art.

The polyester products of this invention are readily melt processed into useful shapes and forms. For example, they may be melt pressed or extruded into films, extruded into rods or other shapes, injection molded or compression molded into various objects, and injected molded preforms may be reheated and blown into bottles, jars and the like.

The materials and testing procedures used for the results shown herein are as follows:

Glass transition temperature (Tg) was determined using a differential scanning calorimeter (DSC).

Inherent viscosity (I.V.) was measured at 23° C. using 0.50 grams of polymer per 100 ml of a solvent consisting of 60% by weight phenol and 40% by weight tetrachloroethane.

The process of the present invention will be further illustrated by a consideration of the following examples, which are intended to be exemplary of the invention. All parts and percentages in the examples are on a weight basis unless otherwise stated.

POLYMER PREPARATION FOR EXAMPLES 1-9

The polymers were prepared using dimethyl2,6-naphthalene dicarboxylate and ethylene glycol using transesterification and polycondensation catalysts and phosphorus compounds as stabilizers. The polymers were prepared by melt phase polymerization to inherent viscosities in the range of 0.48 to 0.54 dl/g. The polymers were ground to give less than three millimeter size particles. The ground polymers were than solid state polymerized to I.V.'s in the range of 0.75 to 0.96 dl/g. The concentration of the alkali metal species derived from the alkali metal salt which was added to the initial reaction mix for each example is indicated in Table I.

Samples of the various ground PEN compositions were placed in 3-dram sample vials. The samples were then placed in a 1-gallon PARR Autoclave which contained a small amount of water. The autoclave was closed and heated until the temperature of the steam that was generated was 121° C. After periods of 121° C. steam treatment ranging from 0 to 12 days, samples of the various polymers were taken from the autoclave and dried. The steam treated samples were analyzed for carboxyl number, number average molecular weight (Mn), weight average molecular weight (Mw), and Z-average molecular weight (Mz).

EXAMPLE 1

Unmodified PEN (0.781 IV)

This polymer was steam treated at 121° C. for 0, 1, 2, 3, 6, and 12 days. The carboxyl number, number average molecular weight and inherent viscosity are summarized in Table I.

The data in Table I for Example 1 indicates that the carboxyl number of the polymer increased rapidly and the number average molecular weight and I.V. decreased rapidly as the days of steam treatment increased.

EXAMPLE 2

PEN (0.781 I.V.) containing 36 ppm sodium (from sodium carbonate).

This polymer was steam-treated at 12° C. for 0–12 days. The carboxyl number, number average molecular weight and inherent viscosity are summarized in Table I.

The data in Table I for Example 2 indicates that the carboxyl number remained essentially constant up through 6 days of steam treatment and increased slightly after 12 days of steam treatment. In addition, the data in Table I shows that the number average molecular weight decreased from 30,779 initially to 25,042 after steam treatment and the I.V. decreased from 0.878 I.V. initially to 0.692 I.V. after 12 days of steam-treatment. This example shows that the addition of 36 ppm sodium species (from sodium carbonate) to the PEN significantly improved the hydrolytic stability in 121° C. steam.

EXAMPLE 3

PEN (0.872 I.V.) containing 41 ppm sodium (from sodium carbonate).

This polymer was steam treated at 121° C. for 0–12 days. The carboxyl number, number average molecular weight and inherent viscosity are summarized in Table I.

The data in Table I for Example 3 indicates that the carboxyl number remained essentially constant up through 6 days of steam treatment and increased slightly after 12 days of treatment, from 10.67 to 23.96. In addition, the data in Table I shows that the number average molecular weight decreased from 33,342 initially to 20,703 after steam treatment and the I.V. decreased from 0.964 I.V. initially to 0.627 I.V. after 12 days of steam treatment at 121° C. This example shows that the addition of 41 ppm sodium species (from sodium carbonate) to the PEN significantly improved the hydrolytic stability in 121° C. steam.

EXAMPLE 4

PEN (0.819 I.V.) containing 65 ppm sodium (from sodium carbonate).

slightly after 9 days of treatment, from 9.09 to 22.60. In addition, the data in Table I shows that the number average molecular weight decreased from 27,438 initially to 17,619 after 12 days of steam treatment at 121° C. and the I.V. decreased from 0.831 I.V. initially to 0.580 I.V. after 12 days of steam treatment at 121° C. This example shows that the addition of 69 ppm sodium species (from sodium carbonate) to the PEN significantly improved the hydrolytic stability in 121° C. steam.

TABLE I

EFFECT OF SODIUM CONTENT ON THE HYDROLYTIC STABILITY OF POLY(ETHYLENE 2,6-NAPHTHALENE DICARBOXYLATE) [PEN]

| Ex. | Polymer Composition | Sodium Content ppm | Solid Stated I.V. | Days in 121° C. Steam | Carboxyl Number | GPC ANALYSIS | | | Estimated I.V. |
|---|---|---|---|---|---|---|---|---|---|
| | | | | | | Mn | Mw | Mz | |
| 1 | PEN | 0 | 0.787 | 0 | | 33,068 | 70,953 | 132,430 | 0.920 |
| | | | | 1 | 5.66 | 29,752 | 62,576 | 114,550 | 0.884 |
| | | | | 2 | 13.66 | 26,952 | 53,325 | 92,952 | 0.755 |
| | | | | 3 | 16.20 | 27,365 | 52,642 | 89,272 | 0.749 |
| | | | | 6 | 27.11 | 24,001 | 45,310 | 74,992 | 0.625 |
| | | | | 12 | 86.76 | 15,123 | 28,419 | 45,147 | 0.489 |
| 2 | PEN | 36 | 0.781 | 0 | | 30,779 | 66,306 | 130,370 | 0.878 |
| | | | | 1 | 12.28 | 29,857 | 58,791 | 109,320 | 0.808 |
| | | | | 2 | 10.17 | 29,490 | 59,790 | 110,800 | 0.817 |
| | | | | 3 | 13.03 | 29,957 | 56,875 | 100,410 | 0.790 |
| | | | | 6 | 12.21 | 27,490 | 53,656 | 94,725 | 0.759 |
| | | | | 12 | 23.90 | 25,042 | 47,026 | 78,002 | 0.692 |
| 3 | PEN | 41 | 0.872 | 0 | 10.67 | 33,342 | 75,851 | 158,920 | 0.964 |
| | | | | 3 | 12.06 | 31,457 | 70,928 | 141,840 | 0.920 |
| | | | | 6 | 13.55 | 31,759 | 68,268 | 135,600 | 0.896 |
| | | | | 9 | 31.95 | 22,585 | 44,536 | 77,978 | 0.667 |
| | | | | 12 | 23.96 | 20,703 | 40,719 | 69,733 | 0.627 |
| 4 | PEN | 65 | 0.819 | 0 | | 31,988 | 72,244 | 149,360 | 0.932 |
| | | | | 1 | 5.89 | 29,399 | 59,563 | 115,360 | 0.815 |
| | | | | 2 | 14.20 | 31,154 | 62,151 | 116,640 | 0.840 |
| | | | | 3 | 3.76 | 30,121 | 60,463 | 114,140 | 0.824 |
| | | | | 6 | 10.14 | 30,944 | 57,021 | 100,820 | 0.791 |
| | | | | 12 | 19.35 | 24,335 | 45,281 | 76,711 | 0.675 |
| 5 | PEN | 69 | 0.812 | 0 | 9.09 | 27,438 | 61,255 | 122,880 | 0.831 |
| | | | | 3 | 12.88 | 37,568 | 78,582 | 150,460 | 0.987 |
| | | | | 6 | 19.46 | 30,111 | 66,332 | 125,200 | 0.878 |
| | | | | 9 | 22.60 | 24,688 | 46,873 | 79,514 | 0.691 |
| | | | | 12 | | 17,619 | 36,396 | 61,313 | 0.580 |

This polymer was steam treated at 121° C. for 0-12 days. The carboxyl number, number average molecular weight and inherent viscosity are summarized in Table I.

The data in Table I for Example 4 indicates that the carboxyl number remained essentially constant up through 6 days of steam treatment and increased slightly after 12 days of treatment, from 5.89 to 19.35. In addition, the data in Table I shows that the number average molecular weight decreased from 30,779 initially to 25,042 after 12 days of steam treatment and the I.V. decreased from 0.878 I.V. initially to 0.692 I.V. after 12 days of steam treatment. This example shows that the addition of 65 ppm sodium species (from sodium carbonate) to the PEN significantly improved the hydrolytic stability in 121° C. steam.

EXAMPLE 5

PEN (0.812 I.V.) containing 69 ppm sodium (from sodium carbonate).

This polymer was steam treated at 121° C. for 0-12 days. The carboxyl number, number average molecular weight and inherent viscosity are summarized in Table I.

The data in Table I for Example 5 indicates that the carboxyl number remained essentially constant up through 6 days of steam treatment and increased

EXAMPLE 6

Potassium carbonate was added to the initial polymerization reaction mixture to provide 50 ppm potassium in the resulting PEN polymer (0.81 I.V.). An improvement in hydrolytic stability similar to that of Examples 2-5 was observed.

EXAMPLE 7

Magnesium carbonate was added to the initial polymerization reaction mixture to provide 60 ppm magnesium in the resulting PEN polymer (0.81 I.V.). An improvement in hydrolytic stability similar to that of Examples 2-5 was observed.

EXAMPLE 8

Lithium carbonate was added to the initial polymerization reaction mixture to provide 75 ppm lithium in the resulting PEN polymer (0.90 I.V.). An improvement in hydrolytic stability similar to that of Examples 2-5 was observed.

EXAMPLE 9

Potassium acetate was added to the initial polymerization reaction mixture to provide 100 ppm potassium in the resulting PEN polymer (0.81 I.V.). An improvement in hydrolytic stability similar to that of Examples 2-5 was observed.

EXAMPLE 10

Sodium acetate was added to the initial polymerization reaction mixture to provide 80 ppm sodium in the resulting PEN polymer (0.75 I.V.). An improvement in hydrolytic stability similar to that of Examples 2-5 was observed.

Many variations will suggest themselves to those skilled in this art in light of the above detailed description. All such obvious modifications are within the full intended scope of the appended claims.

What is claimed is:

1. A process for preparing a hydrolytically stable poly(ethylene-2,6-naphthalene dicarboxylate) polymer which comprises adding 15 ppm to 80 ppm of an alkali metal derived from an alkali metal salt in the melt polymerization reaction mixture during formation of such polymer.

2. A process for preparing a hydrolytically stable poly(ethylene-2,6-naphthalene dicarboxylate) polymer which comprises adding 30 ppm to 70 ppm of an alkali metal derived from an alkali metal salt in the melt polymerization reaction mixture during formation of such polymer.

3. The process according to claim 1 wherein the alkali metal salt is selected from the group consisting of sodium carbonate, sodium acetate, sodium benzoate, sodium succinate, sodium acetylacetonate, sodium methoxide, sodium ethoxide, sodium glycoxide, lithium carbonate, lithium acetate, lithium benzoate, lithium succinate, lithium acetylacetonate, lithium methoxide, lithium ethoxide, lithium glycoxide, potassium acetate, potassium carbonate, potassium benzoate, potassium succinate, potassium acetylacetonate, potassium methoxide, potassium ethoxide, potassium glycoxide, calcium acetate, calcium benzoate, calcium succinate, calcium acetylacetonate, calcium methoxide, calcium ethoxide, calcium glycoxide, magnesium acetate, magnesium benzoate, magnesium succinate, magnesium acetylacetonate, magnesium methoxide, magnesium ethoxide, magnesium glycoxide, and combinations thereof.

4. The process according to claim 3 wherein the alkali metal salt is sodium carbonate.

5. The process according to claim 3 wherein the alkali metal salt is potassium carbonate.

6. The process according to claim 3 wherein the alkali metal salt is magnesium carbonate.

7. The process according to claim 3 wherein the alkali metal salt is lithium carbonate.

8. The process according to claim 3 wherein the alkali metal salt is potassium acetate.

9. The polymer produced by the process of claim 1.

10. The polymer produced by the process of claim 1.

11. The polymer produced by the process of claim 2.

* * * * *